(12) United States Patent
Furuta et al.

(10) Patent No.: US 12,031,937 B2
(45) Date of Patent: Jul. 9, 2024

(54) SENSOR ELEMENT, GAS SENSOR, AND METHOD FOR MANUFACTURING SENSOR ELEMENT

(71) Applicant: NGK SPARK PLUG CO., LTD., Nagoya (JP)

(72) Inventors: Hitoshi Furuta, Nagoya (JP); Akinori Kojima, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 476 days.

(21) Appl. No.: 17/603,098

(22) PCT Filed: Sep. 28, 2020

(86) PCT No.: PCT/JP2020/036562
§ 371 (c)(1),
(2) Date: Oct. 12, 2021

(87) PCT Pub. No.: WO2021/166311
PCT Pub. Date: Aug. 26, 2021

(65) Prior Publication Data
US 2022/0187237 A1    Jun. 16, 2022

(30) Foreign Application Priority Data
Feb. 18, 2020   (JP) .................. 2020-025053

(51) Int. Cl.
*G01N 27/409* (2006.01)
*G01N 27/419* (2006.01)

(52) U.S. Cl.
CPC ......... *G01N 27/409* (2013.01); *G01N 27/419* (2013.01)

(58) Field of Classification Search
CPC .......................................... G01N 27/403–4148
See application file for complete search history.

(56) References Cited

U.S. PATENT DOCUMENTS 9,513,251 B2 * 12/2016 Mori .................. G01N 27/4075
9,823,216 B2 * 11/2017 Wang ................. G01N 27/4075
(Continued)

FOREIGN PATENT DOCUMENTS

JP    2019-148545 A    9/2019

OTHER PUBLICATIONS

International Search Report for PCT/JP2020/036562 dated Nov. 2, 2020 [PCT/ISA/210].

*Primary Examiner* — Alexander A Mercado
(74) *Attorney, Agent, or Firm* — Sughrue Mion, PLLC

(57) ABSTRACT

A sensor element including a first ceramic layer (105), and a measurement electrode (110*a*) and a reference electrode (108*a*) disposed thereon, further comprising a through hole (105*a*) formed in the first ceramic layer, a through hole conductor (121*c*), a reference lead (108*b*) connected to the reference electrode and connected to the through hole conductor, and a second ceramic layer (103) disposed to face the first ceramic layer, the sensor element further including a gas flow chamber (130) provided between the first and second ceramic layers, and facing the through hole and being in communication with the reference lead, and a gas flow passage (170) open to a second region (100*s*) of an outer surface of the sensor element, thereby establishing communication between the gas flow chamber and an outside atmosphere. Also disclosed is gas sensor including the gas sensor element and a method for manufacturing the gas sensor element.

5 Claims, 8 Drawing Sheets

(56) References Cited

U.S. PATENT DOCUMENTS

| | | | | |
|---|---|---|---|---|
| 10,876,991 B2* | 12/2020 | Shimizu | ............... | G01N 27/407 |
| 2007/0080075 A1* | 4/2007 | Wang | ................. | G01N 33/0037 |
| | | | | 205/781 |
| 2008/0016947 A1* | 1/2008 | Mizutani | ............ | G01N 27/4071 |
| | | | | 29/729 |
| 2011/0100815 A1* | 5/2011 | Mori | .................. | G01N 27/4075 |
| | | | | 204/426 |
| 2015/0276658 A1* | 10/2015 | Okazaki | ............ | G01N 27/4071 |
| | | | | 204/431 |
| 2016/0202207 A1* | 7/2016 | Igarashi | ............... | G01N 27/417 |
| | | | | 264/618 |
| 2016/0320333 A1* | 11/2016 | Igarashi | ............... | G01N 27/409 |
| 2018/0031515 A1* | 2/2018 | Wang | ................. | G01N 27/4075 |
| 2019/0265189 A1* | 8/2019 | Shimizu | ............... | G01N 27/407 |

\* cited by examiner

SENSOR ELEMENT, GAS SENSOR, AND METHOD FOR MANUFACTURING SENSOR ELEMENT

CROSS-REFERENCE TO RELATED APPLICATIONS

This application is a National Stage of International Application No. PCT/JP2020/036562 filed Sep. 28, 2020, claiming priority based on Japanese Patent Application No. 2020-025053 filed Feb. 18, 2020, the above-noted applications incorporated herein by reference in their entirety.

BACKGROUND OF THE INVENTION

1. Field of the Invention

The present invention relates to a sensor element suitably used for detecting the concentration of a specific gas contained in, for example, combustion gas or exhaust gas from a combustor, an internal combustion engine, or the like; a gas sensor; and to method for manufacturing the sensor element.

2. Description of the Related Art

Conventionally, a gas sensor for detecting the concentration of a specific component (for example, oxygen) in exhaust gas from an internal combustion engine has been used. The gas sensor has a sensor element disposed therein, and the sensor element includes a plate-shaped solid electrolyte body and at least a pair of electrodes disposed on the solid electrolyte body.

As shown in FIG. 12, according to a known technique for such a gas sensor 1000 (see Patent Document 1), among a pair of electrodes 1001 and 1002, the electrode 1002 is disposed inside the sensor element 1000 and functions as an oxygen reference as a result of oxygen being pumped into the reference electrode 1002 via a solid electrolyte body 1010. A reference lead 1004 is connected to the reference electrode 1002. In such a gas sensor, a very small electric current is caused to flow between the pair of electrodes 1001 and 1002, whereby oxygen is stored in the reference electrode 1002, and the stored oxygen is used as an oxygen reference.

Therefore, in the above technique, a rear end of the reference lead 1004 is exposed to a through hole 1020 provided on the rear end side of the sensor element 1000. As a result, oxygen which has flowed out from the reference electrode 1002 though the reference lead 1004 can be discharged from the through hole 1020.

Patent Document 1: Japanese Patent Application Laid-Open (kokai) No. 2019-148545

3. Problems to be Solved by the Invention

When a through hole conductor is formed on the inner wall of the through hole 1020, the through hole may be blocked by a foreign substance or an electrically conductive paste for the conductor. In such a case, the oxygen which has flowed from the reference lead 1004 into the through hole 1020 can not be discharged to the outside atmosphere. Consequently, maintaining a constant oxygen concentration in the reference electrode 1002 may become difficult, and measurement accuracy may be lowered.

Also, although blocking of the through hole 1020 can be detected when a resultant product is inspected, a product in which the through hole 1020 is blocked is discarded as a defective product, which leads to a decrease in production yield.

SUMMARY OF THE INVENTION

It is therefore an object of the present invention to provide a sensor element which can stably discharge oxygen from a reference electrode to an outside atmosphere even when a through hole is blocked, thereby preventing a decrease in measurement accuracy and increasing yield. Another object of the present invention is to provide a gas sensor including the sensor element and a method for manufacturing the sensor element.

The above objects have been achieved, in accordance with a first aspect of the invention (1), by providing a plate-shaped, stacked sensor element extending in an axial direction and comprising: a first ceramic layer; and a pair of electrodes disposed on opposing surfaces of the first ceramic layer, the pair of electrodes being disposed on one end side of the sensor element in the axial direction and including a measurement electrode which comes into contact with a gas under measurement so as to detect a specific gas, and a porous reference electrode which comes into contact with a reference gas, the sensor element further comprising: a through hole formed in at least the first ceramic layer at a position on the other end side of the sensor element and extending in a stacking direction of the sensor element; a through hole conductor provided on an inner wall which defines the through hole; a porous reference lead connected to the reference electrode, extending toward the other end side of the sensor element, and connected to the through hole conductor; and a gas impermeable second ceramic layer disposed to face the first ceramic layer and sandwich the reference electrode and the reference lead in cooperation with the first ceramic layer, the second ceramic layer extending to a region which overlaps the entirety of the through hole as viewed in the stacking direction, the sensor element being characterized by further comprising: a gas flow chamber which is provided between the first ceramic layer and the second ceramic layer and which faces the through hole and is in communication with the reference lead; and a gas flow passage which is connected to the through hole or the gas flow chamber and is open to a second region of an outer surface of the sensor element, different from a region to which the through hole is open, thereby establishing communication between the gas flow chamber and an outside atmosphere.

In this sensor element, by providing the gas flow passage 170, oxygen from the reference lead 108b can be discharged not only from the through hole (second through hole 105a and third through hole 111a) but also from the gas flow passage 170. As a result, even when the through hole is blocked, oxygen can be stably discharged from the reference electrode 108a to the outside atmosphere, whereby a decrease in measurement accuracy can be prevented.

Also, even in a product of the sensor element 100 in which the through hole is blocked, oxygen can be discharged from the gas flow passage 170. Therefore, it is unnecessary to discard the sensor element as a defective product, and production yield can be improved.

Furthermore, the gas flow passage 170 is connected directly to the through hole or is connected to the through hole via the gap 130. Thus, even when the through hole is blocked and oxygen flows through the gas flow passage, the sensor characteristic of the sensor element does not deviate from a sensor characteristic determined based on diffusion resistance when oxygen is discharged from the through hole. From this point of view as well, a decrease in measurement accuracy can be prevented.

In a preferred embodiment (2) of the sensor element (1) above, the gas flow passage is connected to the gas flow chamber.

In the above sensor element, it is sufficient to provide the gas flow passage only in a necessary layer selected from the layers sandwiching the reference lead. This allows selection of, for example, a structure in which the gas flow passage 170 is not formed in a member (for example, the second ceramic layer) which is high in strength and supports the sensor element 100. Therefore, the number of openings of the element decreases, and a decrease in strength can be suppressed.

In a preferred embodiment (3) of the sensor element (2) above, the sensor element is a laminate of a plurality of ceramic layers including the first ceramic layer and the second ceramic layer; and the gas flow passage is provided in a single but not more than one ceramic layer selected from the plurality of ceramic layers and is open to one of opposite side surfaces of the sensor element extending in the stacking direction and the axial direction or an end surface of the sensor element on the other end side.

In this sensor element, the number of layers in gas flow passage is formed in a single but not more than one layer; that is, since the gas flow passage becomes smaller as compared with the case where the gas flow passage is provided across the plurality of ceramic layers, a decrease in the strength of the sensor element 100 can be suppressed.

Notably, in the case where the gas flow passage is open to a side surface of the sensor element 100 selected so as to shorten the entire length of the gas flow passage, the flow passage resistance can be reduced.

In a second aspect (4), the present invention provides a gas sensor comprising the sensor element of any of (1) to (3) above for detecting the concentration of a specific gas component in a gas under measurement, and a metallic shell holding the sensor element.

In a third aspect (5), the present invention provides a method for manufacturing the sensor element any of (1) to (3) above, comprising: a through hole forming step of forming the through hole extending in the stacking direction of the sensor element in at least a green first ceramic layer, which is to become the first ceramic layer, at a position on the other end side of the sensor element; a through hole conductor forming step of forming a green through hole conductor on the inner wall; a green lead forming step of forming, before or after the through hole conductor forming step, a green lead on a surface of the green first ceramic layer, the surface being located on a side where the reference electrode is provided, the green lead becoming the reference lead, being connected to the reference electrode, extending toward the other end side of the sensor element, and being connected to the green through hole conductor; a stacking step of stacking a green second ceramic layer, which is to become the second ceramic layer, so as to face the green first ceramic layer while sandwiching the reference electrode and the reference lead in cooperation with the green first ceramic layer, the green second ceramic layer extending to a region which overlaps the entirety of the through hole as viewed in the stacking direction; and a firing step of firing the green lead and the green second ceramic layer, wherein a burning-out member which burns out in the firing step so as to form the gas flow passage is formed beforehand prior to the firing step.

According to the present invention, a sensor element can be obtained which stably discharges oxygen from the reference electrode to the outside atmosphere even when the through hole is blocked, thereby preventing a decrease in measurement accuracy and increasing yield.

DESCRIPTION OF REFERENCE NUMERALS

Figure 1:
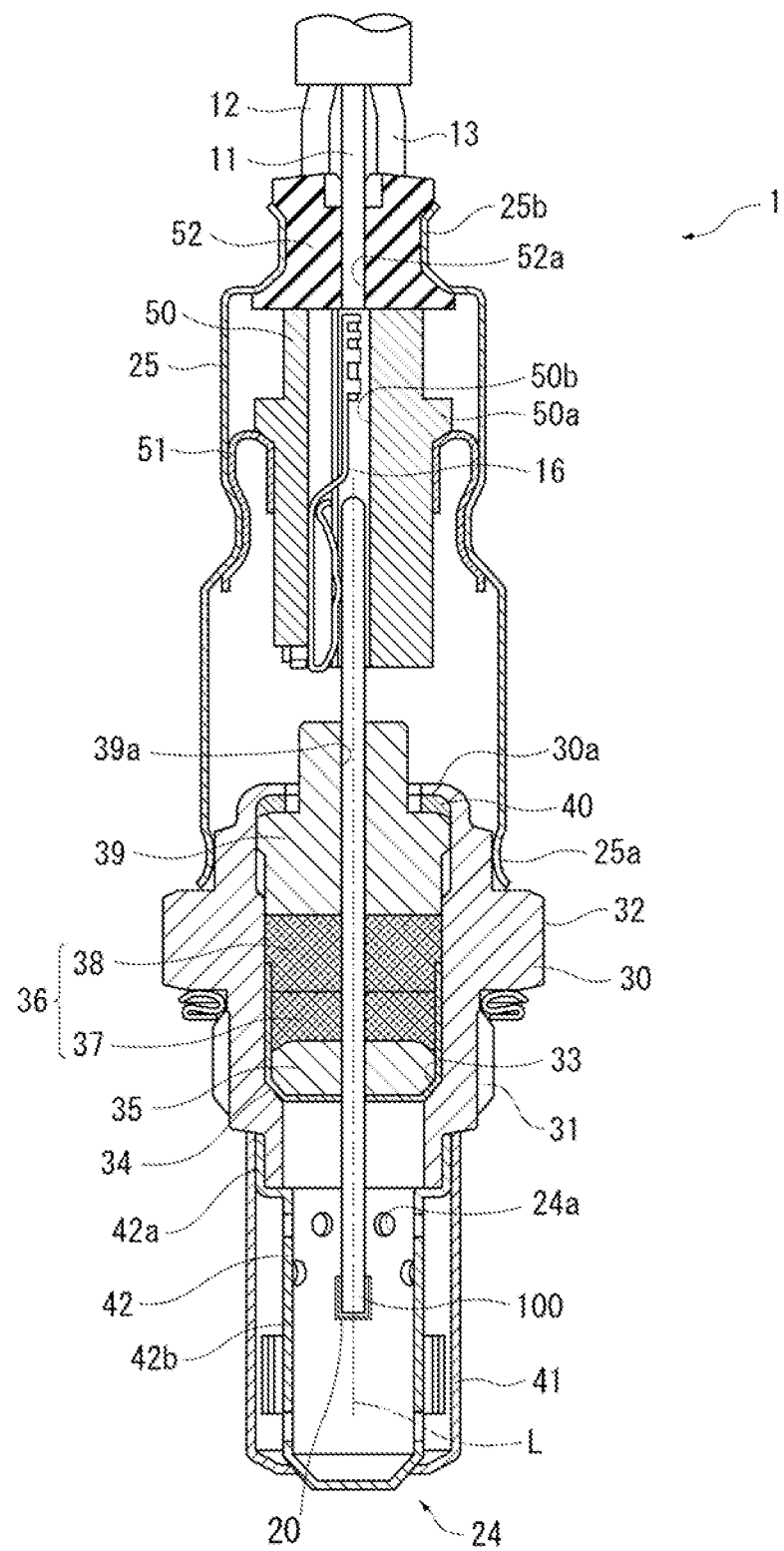
FIG. 1 is a longitudinal sectional view of a gas sensor (oxygen sensor) according to a first embodiment of the present invention.

Reference numerals used to identify various features in the drawings include the following.

1: gas sensor
30: metallic shell
100: sensor element
100s, 100Be: second region
103: second ceramic layer (second substrate)
103x: green second ceramic layer
105: first ceramic layer (solid electrolyte body)
105a, 111a, 165a, 166a: through hole
105x: green first ceramic layer
108a: reference electrode
108b: reference lead
108bx: green lead
110a: measurement electrode
121c, 169c: through hole conductor
121cx: green through hole conductor
130, 132: gas flow chamber
130x: burning-out member
170, 172: gas flow passage
L: axial line

BRIEF DESCRIPTION OF THE PREFERRED EMBODIMENTS

Embodiments of the present invention will be described in greater detail with reference to the drawings. However, the present invention should not be construed as being limited thereto.

Figure 2:
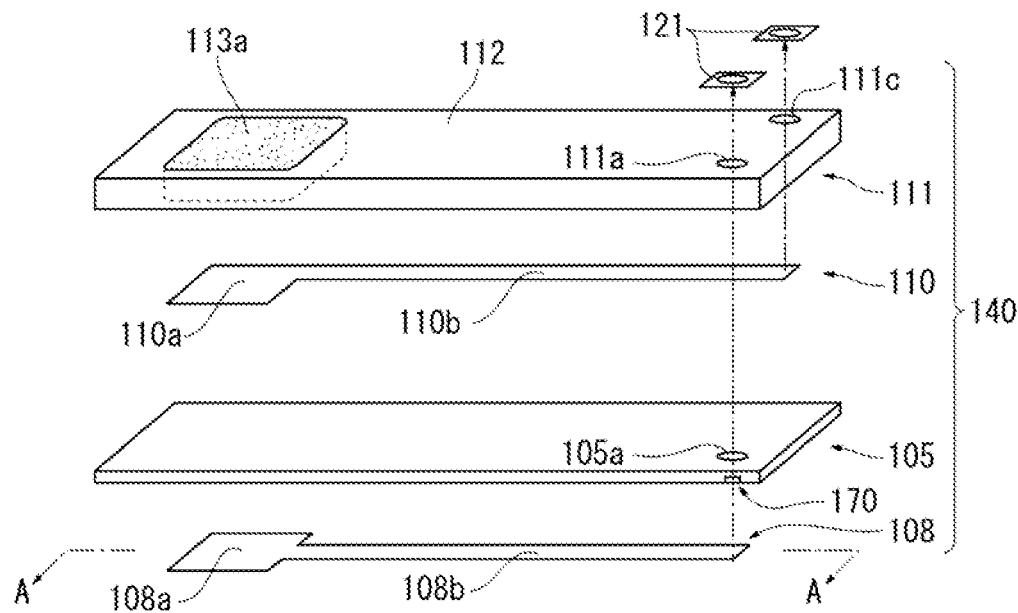
FIG. 2 is a schematic exploded perspective view of a sensor element of FIG. 1.
Figure 2:
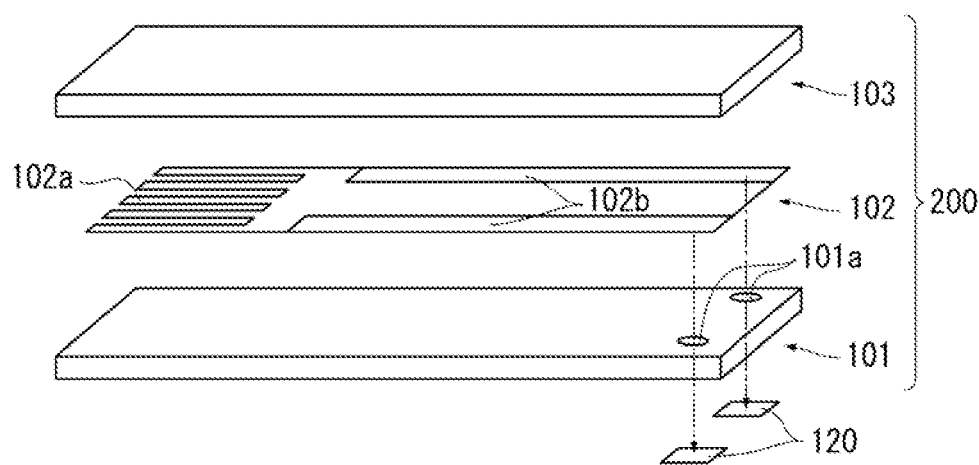
Figure 3:
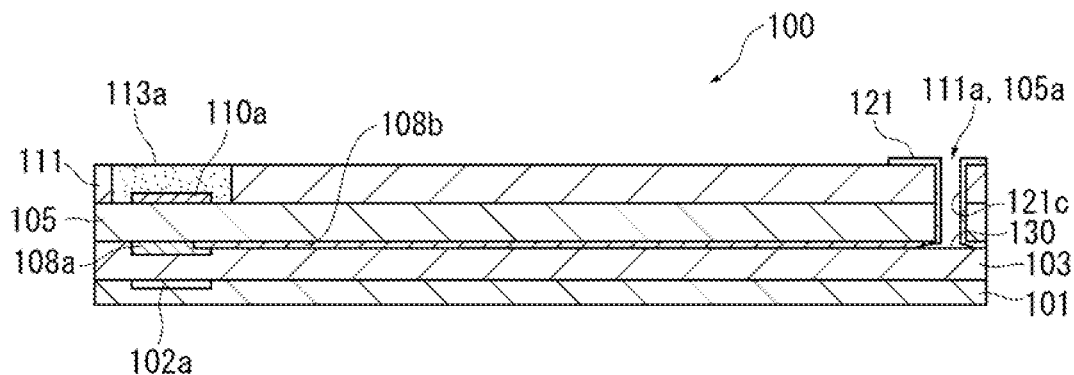
FIG. 3 is a sectional view of the sensor element taken along line A-A of FIG. 2.
Figure 4:
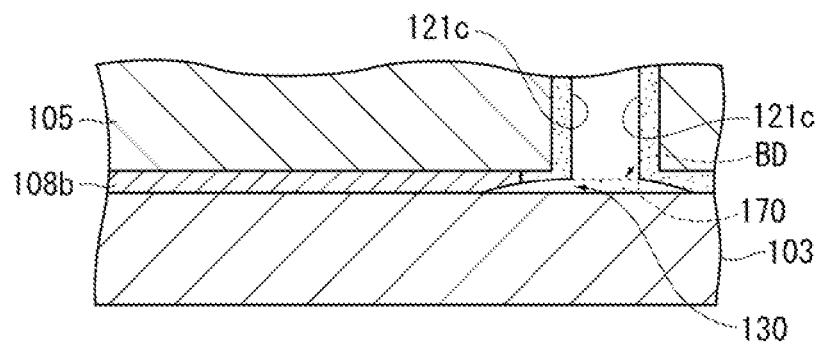
FIG. 4 is a partial enlarged sectional view of FIG. 3.
Figure 5:
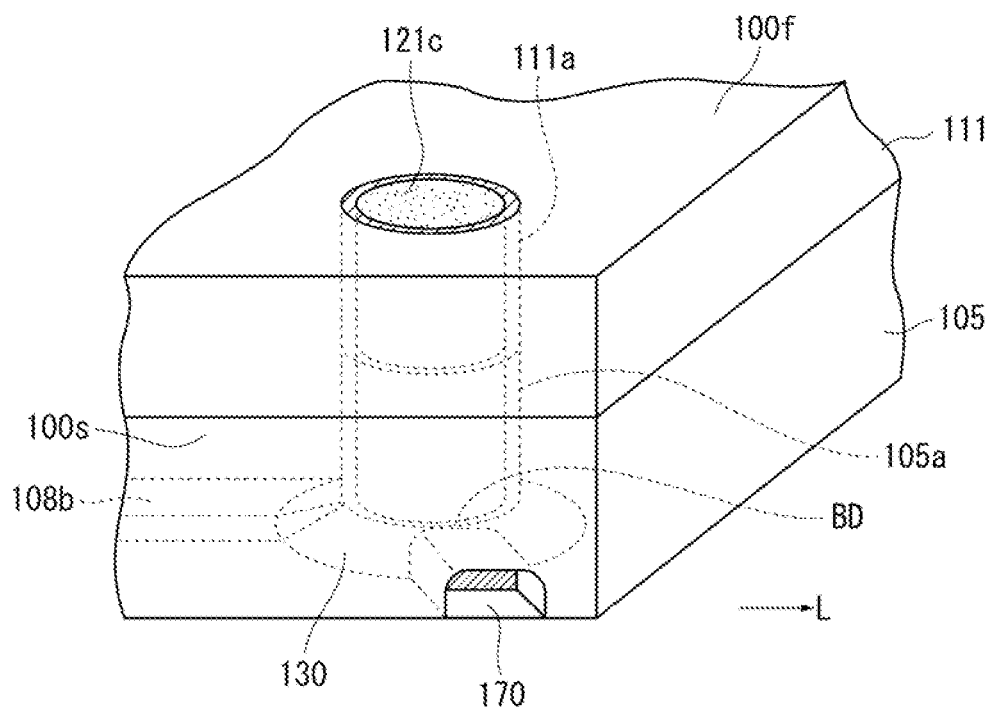
FIG. 5 is a partial enlarged perspective view of a portion of a solid electrolyte body of FIG. 3 in the vicinity of a through hole.
Figure 6:
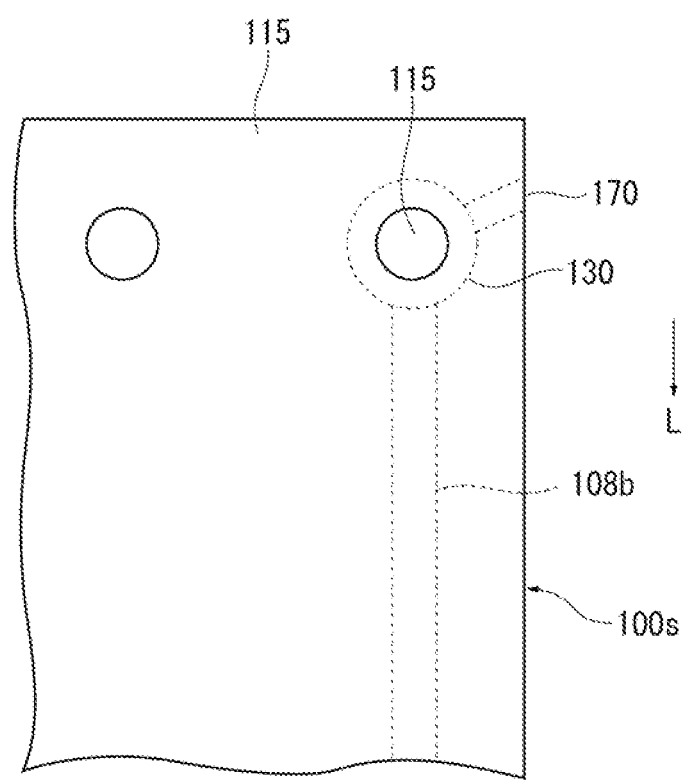
FIG. 6 is a partial enlarged plan view of a portion of the solid electrolyte body of FIG. 3 in the vicinity of the through hole.

FIG. 1 is a sectional view of a gas sensor (oxygen sensor) 1 according to a first embodiment of the present invention, the sectional view being taken in the longitudinal direction (the direction of an axial line L) of the gas sensor. FIG. 2 is a schematic exploded perspective view of a sensor element 100. FIG. 3 is a sectional view of the sensor element 100 taken along line A-A in FIG. 2. FIG. 4 is a partial enlarged sectional view of FIG. 3. FIG. 5 is a partial enlarged perspective view of a portion of a solid electrolyte body 105 of FIG. 3 in the vicinity of a through hole. FIG. 6 is a partial enlarged plan view of a portion of the solid electrolyte body 105 of FIG. 3 in the vicinity of the through hole.

As shown in FIGS. 1 and 2, the gas sensor 1 includes: a one-cell type sensor element 100 composed of an oxygen concentration detection cell 140 and a heater portion 200 stacked on the oxygen concentration detection cell 140; a metallic shell 30 which holds therein the sensor element 100, etc.; a protector 24 attached to a forward end portion of the metallic shell 30; and other components. The sensor element 100 is disposed so as to extend in the direction of the axial line L, and a porous protective layer 20 is disposed so as to cover the entire circumference of a portion of the sensor element 100 on the forward end side.

Notably, the expressions "forward end side" and "rear end side" used herein refer to the forward end side and the rear end side, respectively, in the direction of the axial line L (hereinafter also referred to as the "axial direction").

As shown in FIG. 2, the heater portion 200 of the sensor element 100 includes a substrate 101 and a second substrate 103 which are formed mainly of alumina and the heater portion 200 further includes a heating element 102 sandwiched between the substrate 101 and the second substrate 103 and formed mainly of platinum. The heating element 102 includes a heat generating portion 102a located on the forward end side and a pair of heater lead portions 102b extending from the heat generating portion 102a in the longitudinal direction of the substrate 101. Terminal ends of the heater lead portions 102b are electrically connected to heater-side pads 120 through conductors formed in heater-side through holes 101a formed in the substrate 101.

The oxygen concentration detection cell 140 includes a solid electrolyte body 105 and further includes a measurement electrode 110a and a reference electrode 108a formed on opposite sides of the solid electrolyte body 105 to be located on one end (forward end) side. A measurement lead 110b extending in the longitudinal direction of the solid electrolyte body 105 is electrically connected to the measurement electrode 110a. A reference lead 108b extending in the longitudinal direction of the solid electrolyte body 105 is electrically connected to the reference electrode 108a.

Further, a protective layer 111 is provided so as to cover the measurement electrode 110a and the measurement lead 110b.

A terminal end of the measurement lead 110b is electrically connected to a detection element-side pad 121 through a conductor formed in a first through hole 111c provided in the protective layer 111. Meanwhile, a terminal end of the reference lead 108b is electrically connected to another detection element-side pad 121 through a through hole conductor 121c (see FIG. 3) formed in a second through hole 105a provided in the solid electrolyte body 105 and in a third through hole 111a provided in the protective layer 111.

Each through hole is disposed on the other end (rear end) side of the sensor element.

The solid electrolyte body 105 is composed of a partially stabilized zirconia sintered body prepared by adding yttria ($Y_2O_3$) or calcia (CaO) to zirconia ($ZrO_2$) as a stabilizer.

A very small electric current is caused to flow between the electrodes 108a and 110a of the oxygen concentration detection cell 140 to store oxygen in the reference electrode 108, and the stored oxygen is used as reference oxygen.

The second through hole 105a and the third through hole 111a correspond to the "through hole" of the invention.

The solid electrolyte body 105 and the second substrate 103 correspond to the "first ceramic layer" and the "second ceramic layer," respectively, of the invention.

Notably, the first ceramic layer is not limited to a layer whose entirety is composed of a solid electrolyte body as shown in FIG. 3, and may be a buried-type composite ceramic layer having a portion which is composed of a solid electrolyte body, on which the measurement electrode 110a and the reference electrode 108a are disposed, and which is surrounded by a frame-shaped insulating ceramic member.

Each of the measurement electrode 110a and the reference electrode 108a is formed mainly of a noble metal and contains a ceramic material. The noble metal used may be a platinum group element. Preferred examples of the platinum group element forming these electrodes include Pt, Rh, and Pd. One of these elements may be used alone, or a combination of two or more may be used. From the viewpoint of adhesion, the ceramic component is preferably the same as the main component of a member on which these electrodes are stacked (e.g., the solid electrolyte body 105).

Also, the measurement lead 110b and the reference lead 108b may be formed mainly of a noble metal, and the measurement lead 110b and the reference lead 108b are preferably made denser than the measurement electrode 110a and the reference electrode 108a. Although the measurement lead 110b is not necessarily required to be porous, the reference lead 108b must be porous and have oxygen permeability. Accordingly, the reference lead 108b may contain a ceramic material in addition to the noble metal and have a composition whose ceramic content is smaller than that of the reference electrode 108a.

The heating element 102, the heater-side pads 120, and the detection element-side pads 121 may be formed of a platinum group element.

In consideration of heat resistance and oxidation resistance, the heating element 102, the measurement electrode 110a, the reference electrode 108a, the heater-side pads 120, and the detection element-side pads 121 are preferably formed mainly of Pt. Further, the heating element 102, the measurement electrode 110a, the reference electrode 108a, the measurement lead 110b, the reference lead 108b, the heater-side pads 120, and the detection element-side pads 121 preferably contain a ceramic component, in addition to the platinum group element serving as the main component.

Also, the protective layer 111 is formed on a surface of the solid electrolyte body 105 so as to sandwich the measurement electrode 110a and the measurement lead 110b therebetween. The protective layer 111 includes a porous electrode protecting portion 113a and a reinforcing portion 112. The electrode protecting portion 113a covers the measurement electrode 110a to protect it from being poisoned. The reinforcing portion 112 covers the measurement lead 110b and protects the solid electrolyte body 105.

Returning back to FIG. 1, the metallic shell 30 is made of SUS430 and includes a male screw portion 31 for attaching the gas sensor to an exhaust pipe and a hexagonal portion 32 with which an attachment tool is engaged when the gas sensor is attached to the exhaust pipe. The metallic shell 30 also has a shell-side step portion 33 protruding radially inward, and the shell-side step portion 33 supports a metallic holder 34 used to hold the sensor element 100.

A ceramic holder 35 and talc 36 are disposed inside the metallic holder 34 in this order from the forward end side. The talc 36 includes talc 37 disposed inside the metallic holder 34 and second talc 38 disposed so as to extend beyond the rear end of the metallic holder 34.

The talc 37 is compressed and packed inside the metallic holder 34, so that the sensor element 100 is fixed to the metallic holder 34. The second talc 38 is compressed and packed inside the metallic shell 30, and this provides the sealing between the outer surface of the sensor element 100 and the inner surface of the metallic shell 30. An alumina-made sleeve 39 is disposed on the rear end side of the second talc 38. The sleeve 39 is formed into a stepped cylindrical shape and has an axial hole 39a extending along the axial line, and the sensor element 100 is inserted into the axial hole 39a. A crimp portion 30a at the rear end of the metallic shell 30 is bent inward, so that the sleeve 39 is pressed toward the forward end side of the metallic shell 30 through a stainless steel-made ring member 40.

Also, the metallic protector 24 having a plurality of gas inlet holes 24a is welded to the outer circumference of a forward end portion of the metallic shell 30 so as to cover a forward end portion of the sensor element 100 protruding from the forward end of the metallic shell 30. The protector 24 has a double structure including a closed-end cylindrical outer protector 41 disposed on the outer side and having a uniform outer diameter and a closed-end cylindrical inner protector 42 disposed on the inner side and having a forward end portion 42b and a rear end portion 42a having an outer diameter larger than that of the forward end portion 42b.

Meanwhile, a forward end portion of an outer casing 25 made of SUS430 is fitted to a rear end portion of the metallic shell 30. A forward end portion 25a of the outer casing 25, which portion has an increased diameter on the forward end side, is fixed to the metallic shell 30 by, for example, laser welding. A separator 50 is disposed inside a rear end portion of the outer casing 25, and a holding member 51 is interposed between the separator 50 and the outer casing 25. The holding member 51 engages a protruding portion 50a, described below, of the separator 50. When the outer casing 25 is crimped, the holding member 51 is fixed by the outer casing 25 and the separator 50.

Also, an insertion hole 50b into which lead wires 11 to 14 (the lead wire 14 is not illustrated) for the oxygen concentration detection cell 140 and the heater portion 200 are inserted is formed in the separator 50 so as to extend therethrough from the forward end side toward the rear end side. Connection terminals 16 which connect the lead wires 11 to 14 to the detection element-side pads 121 of the oxygen concentration detection cell 140 and the heater-side pads 120 of the heater portion 200 are disposed in the insertion hole 50b. The lead wires 11 to 14 are connected to an unillustrated external connector, and electric signals are transferred (for input and output of the electric signals) between the lead wires 11 to 14 and an external device such as an ECU through the connector. Although not illustrated in detail, each of the lead wires 11 to 14 has a structure in which a conducting wire is covered with an insulating resin coating.

Furthermore, an approximately cylindrical columnar rubber cap 52 is disposed on the rear end side of the separator 50 to close an opening 25b of the outer casing 25 on the rear end side. The rubber cap 52 is inserted into the rear end of the outer casing 25 and fixed to the outer casing 25 by crimping the outer circumference of the outer casing 25 radially inward. Insertion holes 52a into which the lead wires 11 to 14 are inserted are formed in the rubber cap 52 so as to extend therethrough from the forward end to the rear end.

Next, the structure of a portion in the vicinity of the reference lead 108b and the through hole (the second through hole 105a and the third through hole 111a), which is a feature of the present invention, will be described with reference to FIGS. 3 and 4. FIG. 3 is a sectional view of the sensor element 100 obtained by cutting the sensor element 100 along line A-A in FIG. 2 by a plane parallel to the direction of the axial line L and the stacking direction.

The reference lead 108b is connected to the reference electrode 108a such that the reference lead 108b overlaps a portion of the reference electrode 108a on the rear end side. The reference lead 108b extends in the direction of the axial line L of the sensor element 100 and is in contact with one surface of the solid electrolyte body 105 (its surface on the side toward the heater portion 200). The rear end of the reference lead 108b is connected to the through hole conductor 121c provided on the inner walls of the second through hole 105a and the third through hole 111a.

A gap (gas flow chamber) 130 is formed between the solid electrolyte body 105 and the second substrate 103. The gap 130 faces the second through hole 105a and the third through hole 111a and is in communication with the reference lead 108b. Namely, the gap 130 extends along the direction of the axial line L across the inner walls of the second through hole 105a and the third through hole 111a, further extends through the through hole conductor 121c, and faces the through holes. Notably, the second substrate 103 extends to a region which overlaps the entire second through hole 105a as viewed in the stacking direction. Namely, the second substrate 103 faces the entire bottom surface of the second through hole 105a.

More specifically, the gap 130 extends from the bottom surface of the second through hole 105a (the second substrate 103) toward the solid electrolyte body 105 and has an approximately conical shape approximately coaxial with the through holes and larger in diameter than the through holes. A lower surface (surface on the side toward the second substrate 103) of the terminal end of the reference lead 108b is spaced apart from the second substrate 103 in the stacking direction, is exposed, and partially defines the gap 130.

Notably, the expression "the gap 130 is communication with the reference lead 108b" means that the gap 130 is in communication with (faces) the reference lead 108b but is not in communication with the reference electrode 108a. If the gap 130 is in communication with the reference electrode 108a, the oxygen concentration of the reference electrode 108a becomes the same as the atmosphere, and it becomes impossible to set the oxygen concentration of the reference electrode 108a to an oxygen concentration different from that of the atmosphere.

No limitation is imposed on the length (in the direction of the axial line L) of communication between the gap 130 and the reference lead 108b. However, when the communication length is excessively large, the strength of the sensor element 100 decreases. Accordingly, the gap 130 is preferably in communication with only a portion of the reference lead 108b, more preferably, in communication with only a portion of the reference lead 108b on the terminal end side.

Further, a gas flow passage 170 connected to the gap 130 is provided between the solid electrolyte body 105 and the second substrate 103.

Specifically, as shown in FIGS. 5 and 6, the gas flow passage 170 connected to the gap 130 is open to one side surface 100s of the sensor element 100, thereby establishing communication between the gap 130 and the outside atmosphere.

The side surface 100s corresponds to the "second region" of the invention. This side surface 100s is one of the outer surfaces of the sensor element 100 and differs from an upper surface 100f which is a region to which the third through hole 111a is open.

Notably, as shown in FIGS. 4 and 5, the boundary BD between the through hole (the second through hole 105a) and the gap 130 is determined by considering the second through hole 105a to extend to regions located on extension lines obtained by extending the inner wall of the second through hole 105a in the stacking direction.

Also, in the present example, the gas flow passage 170 extends from the gap 130 (starting point) in a direction which inclines toward the rear end side from a direction along the width direction.

As described above, by providing the gas flow passage 170, oxygen from the reference lead 108b can be discharged not only from the through holes (the second through hole 105a and the third through hole 111a) but also from the gas flow passage 170. As a result, even when the through hole is blocked, oxygen can be stably discharged from the reference electrode 108a to the outside atmosphere, and a decrease in measurement accuracy can be prevented.

Also, even in a product of the sensor element 100 in which the through hole is blocked, oxygen can be discharged from the gas flow passage 170. Therefore, it is unnecessary to discard the sensor element as a defective product, and production yield can be improved.

Notably, since the gas flow passage 170 is a spare discharge passage used when the through hole is blocked, a single gas flow passage 170 is sufficient.

In the case where securing another passage for discharging oxygen to the outside atmosphere upon blockage of the through hole is merely required, for example, the sensor element 100 may be configured so that the gas flow passage 170 faces the reference lead 108b on the forward end side with respect to the through hole or the gap 130.

However, the sensor element 100 has a predetermined sensor characteristic determined based on diffusion resistance when oxygen is discharged from the through hole. Therefore, in the case where the gas flow passage 170 faces the reference lead 108b on the forward end side with respect to the through hole or the gap 130, the diffusion resistance acting on oxygen discharged from the reference lead 108b to the outside atmosphere changes from a set value, and measurement accuracy deteriorates.

Figure 9:
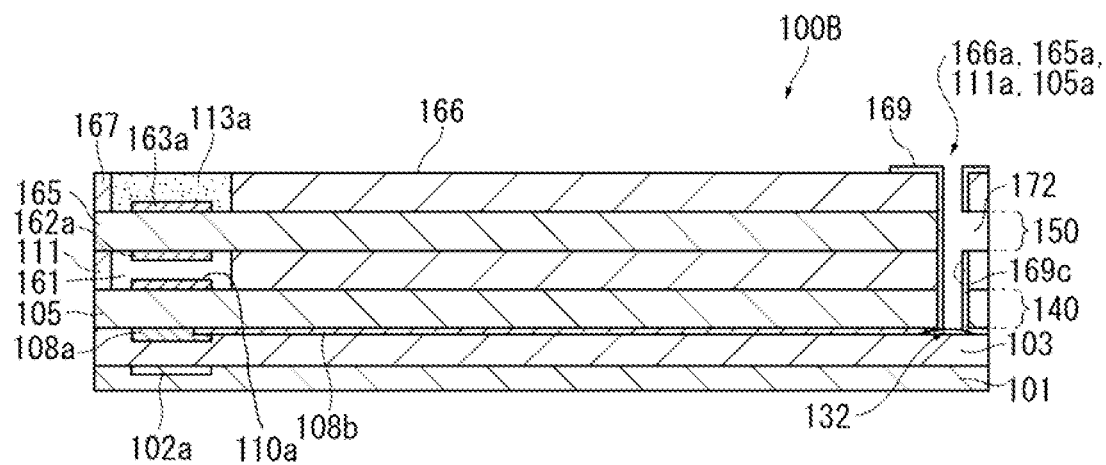
FIG. 9 is a sectional view showing a sensor element according to a second embodiment of the present invention.
Figure 10:
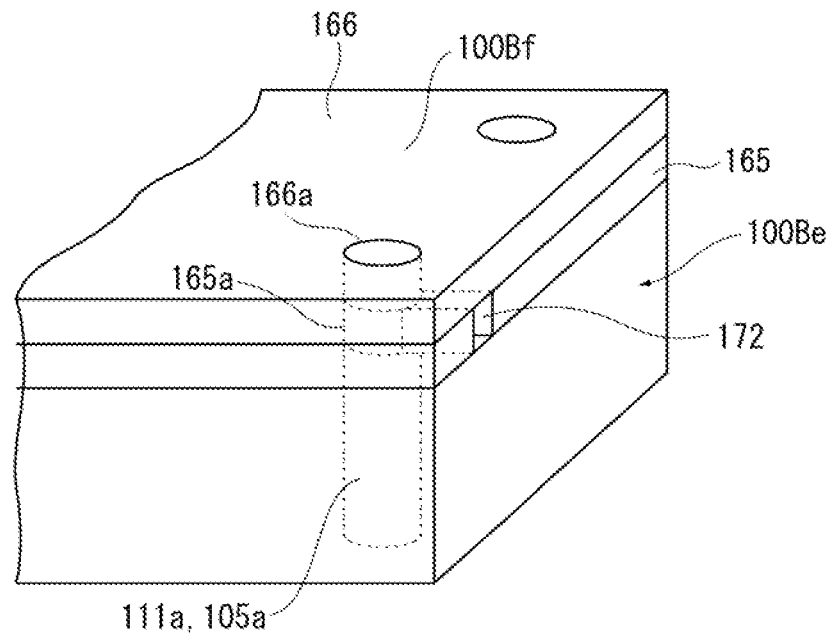
FIG. 10 is a partial enlarged perspective view of a portion of a solid electrolyte body of FIG. 9 in the vicinity of a through hole.
Figure 11:
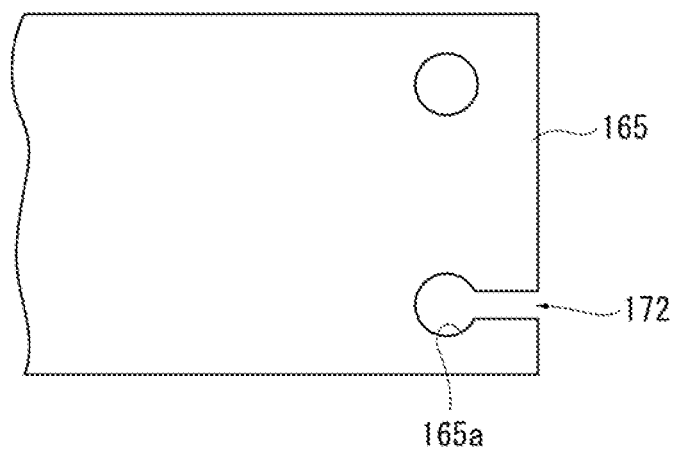
FIG. 11 is a partial enlarged plan view of a portion of the solid electrolyte body of FIG. 9 in the vicinity of the through hole.
Figure 12:
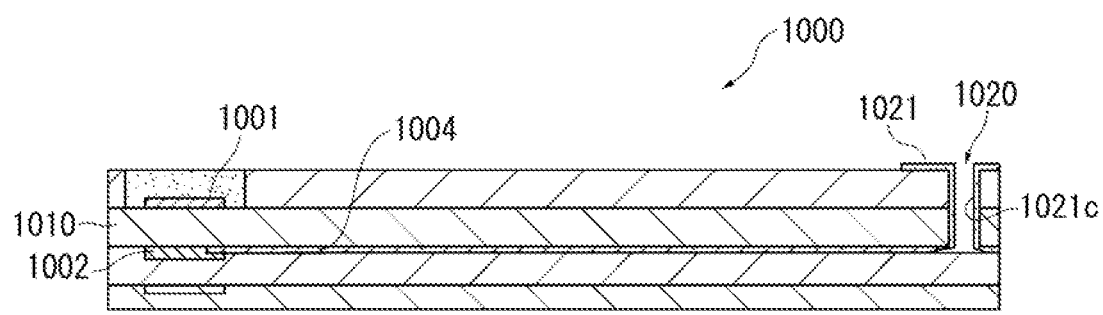
FIG. 12 is a sectional view of a conventional sensor element.

Therefore, the gas flow passage 170 must be connected to the through hole (the second through hole 105a or the third through hole 111a) via the gap 130, or connected directly to the through hole as shown in FIGS. 9 to 11, which will be described below.

Thus, even when the through hole is blocked and oxygen flows through the gas flow passage 170, the sensor characteristic of the sensor element 100 does not deviate from the sensor characteristic determined based on the diffusion resistance when oxygen is discharged from the through hole, and a decrease in measurement accuracy can be prevented.

Notably, the gap 130 is provided for the following reason.

Namely, as described below, when the sensor element 100 is manufactured, a relatively hard green second substrate 103 (green sheet or the like) is stacked on a layer of electrically conductive paste which is to become the reference lead 108b. At that time, the green second substrate 103 crushes the through hole conductor 121c or the electrically conductive paste layer in the vicinity of the through hole conductor 121c.

In view of this, a burning out material is provided on the surface of the electrically conductive paste layer in the vicinity of the through hole conductor 121c so that the burning out material is located at a position where the gas flow chamber (gap) 130 is to be formed. Thus, the second substrate 103 is prevented from coming into direct contact with the through hole conductor 121c or the electrically conductive paste layer.

As a result, the through hole conductor 121c and a portion (portion connected to the through hole conductor 121c) of the electrically conductive paste layer in the vicinity of the through hole conductor 121c are prevented from being crushed and becoming thinner. Thus, it is possible to prevent a problematic phenomenon in which an obtained reference lead 108b has changed oxygen permeability and the gas detection output becomes instable. Also, since the reference lead 108b is in communication with (exposed to) the gas flow chamber 130, oxygen can be reliably discharged from the reference lead 108b to the through hole via the gas flow chamber 130.

Notably, although it is sufficient to set the thickness of the gas flow chamber 130 so that it is not 0, from the viewpoint of oxygen permeability, the gas flow chamber 130 preferably has a thickness of 1 μm or greater.

Next, an example method for manufacturing the sensor element 100 will be described with reference to FIGS. 7A to 7F.

Figure 7A:
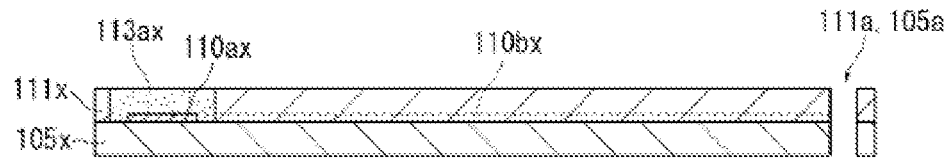
FIGS. 7A to 7F are views showing the steps of a method for manufacturing the sensor element according to the first embodiment of the present invention.

First, as shown in FIG. 7A, electrically conductive pastes 110ax and 110bx which are to become the measurement electrode 110a and the measurement lead 110b, respectively, are applied, by means of printing, to the surface (upper surface in FIG. 7A) of a green solid electrolyte body 105x. Subsequently, a green protective layer 111x (including a green electrode protection portion 113ax) formed of a green sheet is stacked on the solid electrolyte body 105x so as to cover the electrically conductive pastes 110ax and 110bx.

Subsequently, the through holes extending in the stacking direction (the second and third through holes 105a and 111a) and the first through hole 111c are formed in rear end-side portions of the solid electrolyte body 105x and the protective layer 111x (through hole forming step).

Notably, the solid electrolyte body 105x corresponds to the "green first ceramic layer" of the invention.

Figure 7B:
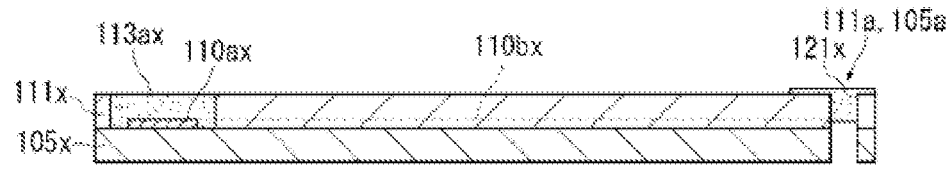

Next, as shown in FIG. 7B, a conductor paste 121x which is the material of the detection element-side pad 121 and the through hole conductor 121c is supplied (charged) from the third through hole 111a on the protective layer 111x side. At that time, the conductor paste 121x is supplied so that each of the through holes 111a and 111c is partially filled with the conductor paste 121x.

Figure 7C:
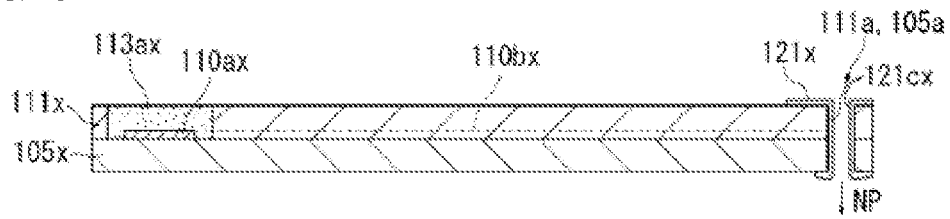

Subsequently, as shown in FIG. 7C, a negative pressure NP is created on the solid electrolyte body 105x side opposite the protective layer 111x with respect to the through holes, so that the conductor paste 121x flows (is sucked in) to the surface of the solid electrolyte body 105x through the through holes. Due to the negative pressure NP, the conductor paste 121x forms protrusions around the through holes on the surface of the solid electrolyte body 105x. The through hole conductor 121cx covers the inner wall of each through hole. In the above-described manner, the green detection element-side pad 121x and the green through hole conductor 121cx are formed (through hole conductor forming step).

Notably, the through hole conductor for the first through hole 111c is formed as follows. A through hole conductor is formed in each of layers before they are stacked together, and the layers are stacked to complete the first through hole 111c. The through hole conductor 121cx may be formed in the same manner. First, a through hole conductor is formed in each of the layers 105x and 111x of FIG. 7A before they are stacked together, and the layers 105x and 111x are stacked to complete the through hole conductor 121cx. In this case, when the layers are stacked after forming the through hole conductors therein, corresponding end portions of the through hole conductors (formed of paste) of the layers are connected to each other.

The through hole conductor 121cx corresponds to the "green through hole conductor" of the invention.

Figure 7D:
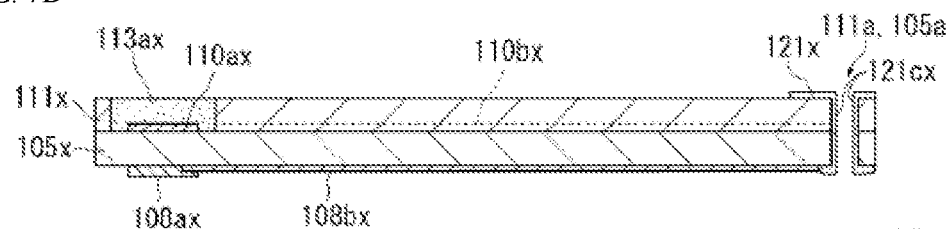

Next, as shown in FIG. 7D, electrically conductive pastes 108ax and 108bx which are to become the reference electrode 108a and the reference lead 108b, respectively, are applied, by means of printing, to the lower surface (surface on the reference electrode 108a side) of the solid electrolyte body 105x before or after the through hole conductor forming step shown in FIG. 7C (in the present example, after the through hole conductor forming step). At that time, the printing is performed so that the rear end of the electrically conductive paste (green lead) 108bx is laid on the through hole conductor 121cx extending along the lower surface of the solid electrolyte body 105x (the rear end of the electrically conductive paste 108bx is electrically connected to the through hole conductor 121cx) (green lead forming step).

Notably, the electrically conductive paste 108bx corresponds to the "green lead" of the invention.

Figure 7E:
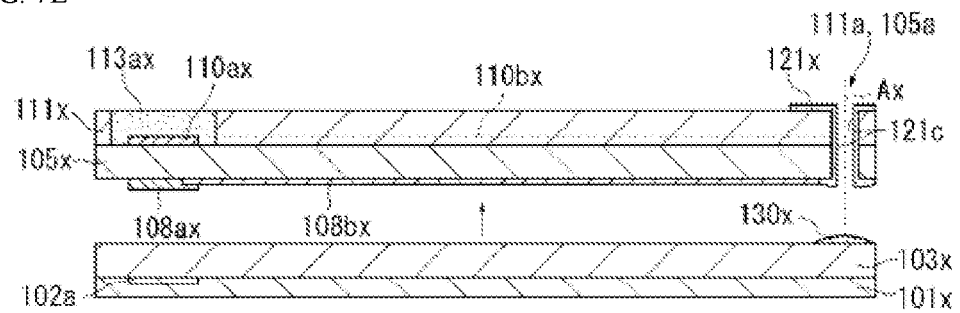

Next, as shown in FIG. 7E, a green substrate 101x and a green second substrate 103x each formed of green sheet are stacked beforehand so that an electrically conductive paste 102ax which is to become the heat generating portion 102a is sandwiched between the green substrate 101x and the green second substrate 103x. Subsequently, a burning-out member 130x is formed beforehand by applying a material of the burning-out member 130x, by means of printing, to a region of the surface of the laminate on the second substrate 103x side, which region has a center at the axial line Ax of the through hole (the second through hole 105a and the third through hole 111a) and is larger in diameter than the through hole (a region facing the through hole and located adjacent to the green lead 108bx) so that the burning-out member 130x rises and forms a dome-like shape.

Figure 7F:
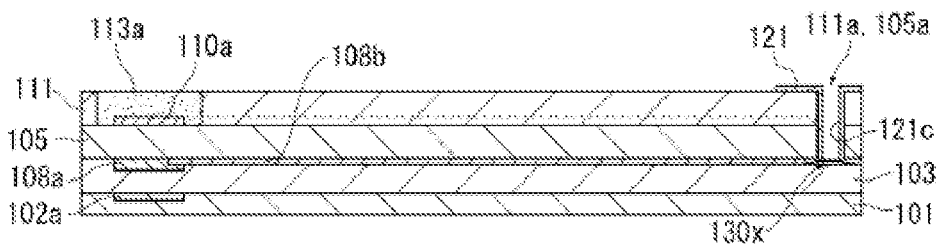

Subsequently, as shown in FIG. 7F, for stacking, the second substrate 103x side of the laminate is brought into contact with the lower surface of the solid electrolyte body 105x so as to cover at least the green lead 108bx (stacking step). At that time, since the electrically conductive pastes 108bx and 121x each containing a metal is softer than the burning-out member 130x, the electrically conductive pastes 108bx and 121x are pressed and concaved upward (toward the protective layer 111x side) by the burning-out member 130x.

Notably, the second substrate 103x corresponds to the "green second ceramic layer" of the invention.

The entire laminate containing the green lead 108bx and the second substrate 103x is fired (firing step). As a result of the firing, the burning-out member 130x burns out, whereby the gap 130 and the gas flow passage 170 are formed, and the sensor element 100 shown in FIGS. 3 and 4 is completed.

Figure 8:
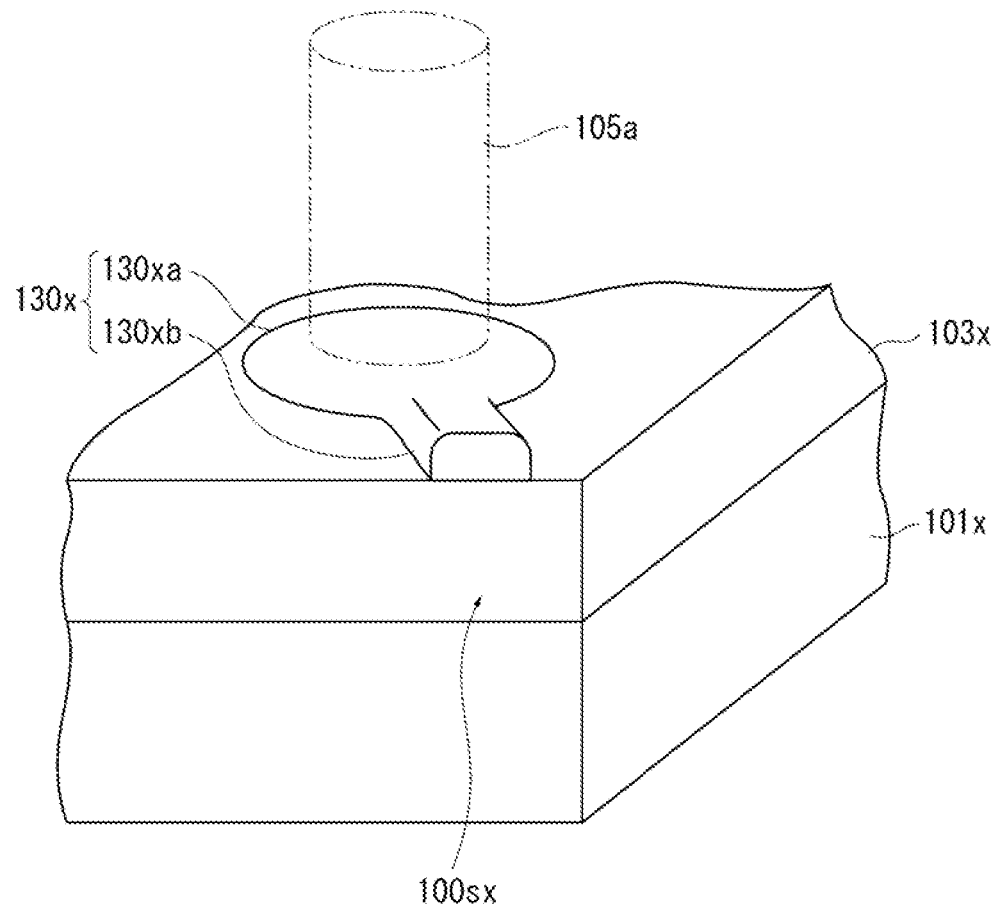
FIG. 8 is a perspective view showing a burning-out member in FIG. 7.

FIG. 8 is a perspective view of the burning-out member 130x shown in FIG. 7E.

The burning-out member 130x has a dome-shaped main body portion 130xa and a branch portion 130xb integrally formed. The branch portion 130xb extends from the main body portion 130xa to one side surface 100sx and rises to form a ridge-like shape.

The gap 130 is formed as a result of burning out of the main body portion 130xa, and the gas flow passage 170 is formed as a result of burning out of the branch portion 130xb.

Notably, in the stacking step, the solid electrolyte body 105x conforms to the burning-out member 130x; namely, the solid electrolyte body 105x is partially pressed and concaved upward (toward the protective layer 111x side) by the branch portion 130xb of the burning-out member 130x, whereby the gas flow passage 170 is formed.

A material, such as carbon, which burns out at 1000° C. or lower can be used as the material for forming the burning-out member 130x.

Notably, the green lead forming step shown in FIG. 7D may be performed before the through hole conductor forming step shown in FIG. 7C. In this case, the green lead 108bx is formed on the lower surface of the solid electrolyte body 105x so as to extend to a position near the circumferential edge of the second through hole 105a. By virtue of this configuration, when the through hole conductor 121cx spreads onto the lower surface of the solid electrolyte body 105x due to the negative pressure NP as shown in FIG. 7C, the through hole conductor 121cx lies on the green lead 108bx, whereby the through hole conductor 121cx and the green lead 108bx are connected to each other.

The manner of forming the burning-out member 130x beforehand in the stacking step shown in FIGS. 7E and 7F is not limited to forming the burning-out member 130x on the second substrate 103x side. The burning-out member 130x may be formed on the solid electrolyte body 105x side.

Next, a gas sensor according to a second embodiment of the present invention will be described with reference to FIGS. 9 to 11. However, since the gas sensor according to the second embodiment is identical to the gas sensor according to the first embodiment except for employing a sensor element 100B having a different structure, only the structure of the sensor element 100B will be described.

FIG. 9 is a sectional view of the sensor element 100B according to the second embodiment of the present invention, taken along the direction of the axial line L, the sectional view corresponding to the sectional view of FIG. 3.

As shown in FIG. 9, the sensor element 100B is a two-cell-type sensor element which includes the oxygen concentration detection cell 140 and the heater portion 200 stacked on the oxygen concentration detection cell 140 and additionally includes an oxygen pump cell 150 stacked on the opposite surface of the oxygen concentration detection cell 140.

Since the oxygen concentration detection cell 140 and the heater portion 200 are identical to those of the sensor element 100 according to the first embodiment, their description will not be repeated.

The oxygen pump cell 150 is formed by a solid electrolyte body 165 and a first pump electrode 162a and a second pump electrode 163a formed on opposite sides of the solid electrolyte body 165. Leads (not shown) each extending in the longitudinal direction of the solid electrolyte body 165 are electrically connected to the first pump electrode 162a and the second pump electrode 163a.

The first pump electrode 162a is disposed on the lower surface of the solid electrolyte body 165 (on the side toward the oxygen concentration detection cell 140) and faces the interior of a measurement space 161 formed by making an approximately rectangular cutout in a forward end portion of the protective layer 111. Similarly, the measurement electrode 110a faces the interior of the measurement space 161, and the first pump electrode 162a and the measurement electrode 110a face each other in the interior of the measurement space 161.

Notably, the measurement space 161 corresponds to a space formed by removing the electrode protection section 113a in the sensor element 100 according to the first embodiment.

Meanwhile, the second pump electrode 163a is disposed on the upper surface of the solid electrolyte body 165 (on the side opposite the oxygen concentration detection cell 140). A protective layer 167 is provided to cover the second pump electrode 163a and its lead (not shown).

Like the protective layer 111 in the sensor element 100 according to the first embodiment, the protective layer 167 includes a porous electrode protecting portion 113a and a reinforcing portion 166. The porous electrode protecting portion 113a covers the second pump electrode 163a to protect it from being poisoned. The reinforcing portion 166 covers the lead (not shown) and protects the solid electrolyte body 165.

In the second embodiment, the terminal end of the reference lead 108b is electrically connected to a detection element-side pad 169 through a through hole conductor 169c formed in each of the second through hole 105a (see FIG. 2) provided in the solid electrolyte body 105, the third through hole 111a (see FIG. 2) provided in the protective layer 111, a fourth through hole 165a provided in the solid electrolyte body 165, and a fifth through hole 166a provided in the protective layer 167.

The second through hole 105a, the third through hole 111a, the fourth through hole 165a, and the fifth through hole 166a correspond to the "through hole" of the invention.

Notably, terminal ends of the leads extending from the first pump electrode 162a and the second pump electrode 163a, respectively, are electrically connected to other detection element-side pads 169 through conductors (not shown) formed in through holes penetrating the solid electrolyte body 165 and the protective layer 167.

The sensor element 100B corresponds to an oxygen sensor element in which the flow direction and magnitude of current flowing between the electrodes of the oxygen pump cell 150 are adjusted such that the voltage (electromotive force) generated between the electrodes of the oxygen concentration detection cell 140 becomes equal to a predetermined value (for example, 450 mV) and which linearly detects the concentration of oxygen in a gas under measurement in accordance with the current flowing through the oxygen pump cell 150.

As shown in FIG. 9, in the sensor element 100B as well, a gas flow chamber (gap) 132 which faces the second through hole 105a and the third through hole 111a and is in communication with the reference lead 108b is formed between the solid electrolyte body 105 and the second substrate 103. The gap 132 has the shape of a dome which is convexed toward the solid electrolyte body 105 from the second substrate 103.

Further, as shown in FIGS. 10 and 11, a gas flow passage 172 is provided. The gas flow passage 172 penetrates the solid electrolyte body 165 and is connected to the gap 132.

Specifically, the gas flow passage 172 is connected to the gap 132 and is open to a rearward facing surface 100Be of the sensor element 100, thereby establishing communication between the gap 132 and the outside atmosphere. As shown in FIG. 11, the gas flow passage 172 can be formed as follows. When the fourth through hole 165a is formed in a sheet of the green solid electrolyte body 165 by means of punching, the sheet is punched so as to simultaneously form the gas flow passage 172 which communicates with the fourth through hole 165a and is open to the rearward facing surface 100Be.

The rearward facing surface 100Be corresponds to the "second region" of the invention. This rearward facing surface 100e is one of the outer surfaces of the sensor element 100 and differs from the upper surface 100Bf, which is a region to which the through hole (the fifth through hole 166a) is open.

In the second embodiment as well, due to the gas flow passage 172, oxygen from the reference lead 108b can be discharged not only from the through hole but also from the gas flow passage 172. As a result, even when the through hole is blocked, oxygen can be stably discharged from the reference electrode 108a to the outside atmosphere, whereby a decrease in measurement accuracy can be prevented. Also, production yield can be increased.

Notably, in the first embodiment, the gas flow passage 170 is connected to the gap 130. When the gap 130 and the gas flow passage 170 are formed by forming the above-described burning-out member 130x on the second substrate 103x side, it is unnecessary to form the gas flow passage 170 in a member (for example, the second substrate 103x) which supports the sensor element 100. Therefore, the number of openings of the element decreases, and a decrease in strength can be prevented.

Namely, it is sufficient to provide the gas flow passage 170 only in the layer 105 which is a necessary layer selected from the layers 105 and 103 sandwiching the reference lead 108b. This allows selection of, for example, a structure in which the gas flow passage 170 is not formed in a member (for example, the second substrate 103) which is high in strength and supports the sensor element 100.

Meanwhile, in the second embodiment, the gas flow passage 172 is connected to the through hole. As a result, a passage for discharging oxygen to the outside atmosphere can be provided at a position different from the position of the gap 130.

Also, in the case where the gas flow passage is provided in a single ceramic layer (the solid electrolyte body 105 in the first embodiment or the solid electrolyte body 165 in the second embodiment) selected from the plurality of ceramic layers constituting the sensor element 100, since the number of layers in which the gas flow passage is formed becomes one; that is, becomes smaller as compared with the case where the gas flow passage is provided across a plurality of ceramic layers, a decrease in the strength of the sensor element 100 can be suppressed.

Notably, in the case where the gas flow passage is open to a side surface of the sensor element 100 selected so as to shorten the entire length of the gas flow passage, the flow passage resistance can be reduced.

The present invention is not limited to the above embodiments and is applicable to any gas sensor (sensor element) including an oxygen detection cell having a solid electrolyte body, a measurement electrode, and a reference electrode. The present invention can be applied not only to the oxygen sensors (oxygen sensor elements) of the present embodiments but also to, for example, NOx sensors (NOx sensor elements). The number of cells is not limited to one or two described above, and the present invention can be applied to, for example, a three-cell-type NOx sensor.

The shapes of the gas flow chamber and the gas flow passage are not limited to those employed in the above-described embodiments.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. A plate-shaped, stacked sensor element extending in an axial direction and comprising:
    a first ceramic layer; and
    a pair of electrodes disposed on opposing surfaces of the first ceramic layer,
    the pair of electrodes being disposed on one end side of the sensor element in the axial direction and including a measurement electrode which comes into contact with a gas under measurement so as to detect a specific gas, and a porous reference electrode which comes into contact with a reference gas,
    the sensor element further comprising:
    a through hole formed in at least the first ceramic layer at a position on the other end side of the sensor element and extending in a stacking direction of the sensor element;
    a through hole conductor provided on an inner wall which defines the through hole;
    a porous reference lead connected to the reference electrode, extending toward the other end side of the sensor element, and connected to the through hole conductor; and
    a gas impermeable second ceramic layer disposed to face the first ceramic layer and sandwich the reference electrode and the reference lead in cooperation with the first ceramic layer, the second ceramic layer extending to a region which overlaps the entirety of the through hole as viewed in the stacking direction,
    the sensor element being characterized by further comprising:
    a gas flow chamber which is provided between the first ceramic layer and the second ceramic layer and which faces the through hole and is in communication with the reference lead; and
    a gas flow passage which is connected to the through hole or the gas flow chamber and is open to a second region of an outer surface of the sensor element, different from a region to which the through hole is open, thereby establishing communication between the gas flow chamber and an outside atmosphere.

2. The sensor element as claimed in claim 1, wherein the gas flow passage is connected to the gas flow chamber.

3. The sensor element as claimed in claim 2, wherein
    the sensor element is a laminate of a plurality of ceramic layers including the first ceramic layer and the second ceramic layer; and
    the gas flow passage is provided in a single but not more than one ceramic layer selected from the plurality of ceramic layers and is open to one of opposite side surfaces of the sensor element extending in the stacking direction and the axial direction or an end surface of the sensor element on the other end side.

4. A gas sensor comprising the sensor element as claimed in claim 1 for detecting the concentration of a specific gas component in a gas under measurement, and a metallic shell holding the sensor element.

5. A method for manufacturing a sensor element as claimed in claim 1, characterized by comprising:
    a through hole forming step of forming the through hole extending in the stacking direction of the sensor element in at least a green first ceramic layer, which is to become the first ceramic layer, at a position on the other end side of the sensor element;
    a through hole conductor forming step of forming a green through hole conductor on the inner wall;
    a green lead forming step of forming, before or after the through hole conductor forming step, a green lead on a surface of the green first ceramic layer, the surface being located on a side where the reference electrode is provided, the green lead becoming the reference lead, being connected to the reference electrode, extending toward the other end side of the sensor element, and being connected to the green through hole conductor;
    a stacking step of stacking a green second ceramic layer, which is to become the second ceramic layer, so as to face the green first ceramic layer while sandwiching the reference electrode and the reference lead in cooperation with the green first ceramic layer, the green second ceramic layer extending to a region which overlaps the entirety of the through hole as viewed in the stacking direction; and
    a firing step of firing the green lead and the green second ceramic layer,
    wherein a burning-out member which burns out in the firing step so as to form the gas flow passage is formed beforehand prior to the firing step.

* * * * *